April 30, 1963 E. TAUTNER ET AL 3,088,080

CIRCUIT ARRANGEMENTS FOR FREQUENCY MODULATION

Filed June 20, 1960

INVENTOR
ERWIN TAUTNER
THEODORUS H. J. DE LAAT
BY
Frank R. Jifani
AGENT

United States Patent Office 3,088,080

Patented Apr. 30, 1963

3,088,080

CIRCUIT ARRANGEMENTS FOR FREQUENCY MODULATION

Erwin Tautner and Theodorus Herman Johan de Laat, Hilversum, Netherlands, assignors to North American Philips Company, Inc., New York, N.Y., a corporation of Delaware Filed June 20, 1960, Ser. No. 37,178
Claims priority, application Netherlands June 18, 1959
6 Claims. (Cl. 332—24)

Figure 1:
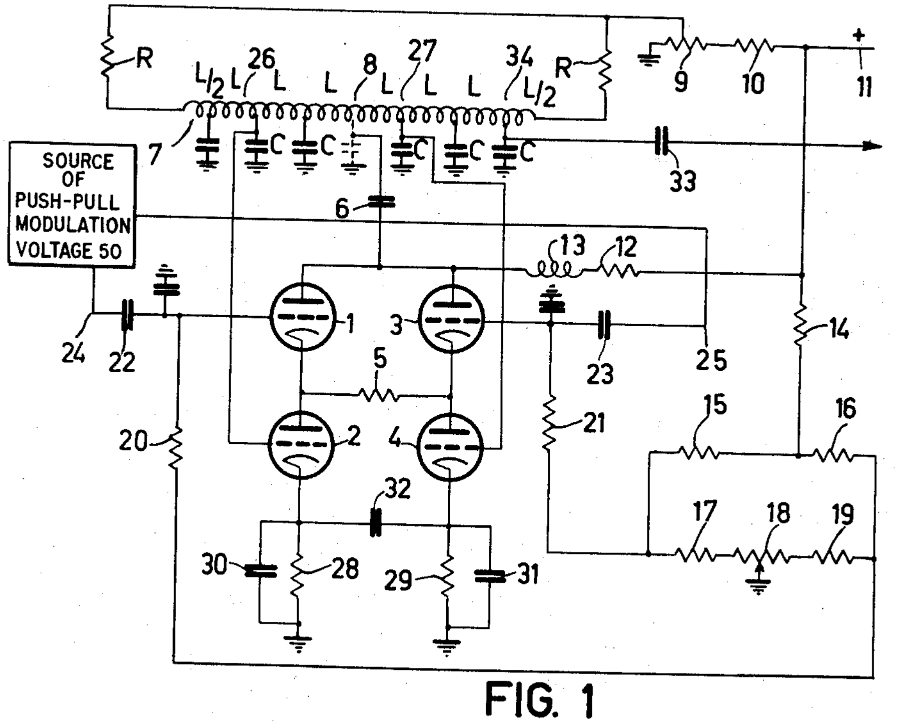

The invention relates to circuit arrangements for frequency modulation by means of two discharge systems in generator arrangement which, via points with mutual phase difference of a delay network, are fed back, which two discharge systems are controlled by modulation voltages in opposite senses.

Such a circuit arrangement is known, for example, from British patent specification 512,028.

In this known circuit arrangement, the same control grid is used in each of the discharge systems both for generating the high-frequency oscillation and for frequency modulation thereof. This involves difficulties, especially in the case of frequency modulators having a wide modulation spectrum, where high requirements are imposed on the phase transmission times. The modulation oscillations and carrier-wave oscillations respectively to be supplied collectively to the grid must, as a matter of fact, be separated from each other by filters which must then have a negligible phase transit time variation and, throughout the width of the modulation spectrum, which may amount to about 20 mc./s., must not show any phase variations which would change the modulation characteristic. These combined requirements cannot, be met or only with difficulty.

As is likewise known, this drawback may be avoided by using two pentodes for the said two discharge systems, and applying the modulation oscillations between other grids, for example the screen grids thereof. However, this entails other difficulties. For example, modulation on a screen grid is considerably more energy-consuming than modulation on a control grid which, as a matter of fact, is kept at a far lower potential level. For the same reason, the screen grid cannot be used for restoring the direct voltage level in television, which has to be effected at a point of high impedance. Finally, a linear effect cannot be obtained when modulating on a screen grid, since in the case of modulation of the voltage on this grid the screen grid current changes, which involves undue additional voltage variations of the screen grid.

It is also known to supply the modulation oscillations to the suppressor grids of two pentodes. However, the modulation sensitivity obtained in this case is low and non-linear, which necessitates a higher modulation voltage and this, in turn, involves difficulties as regards decoupling and distortion.

An object of the present invention is to provide a circuit arrangement which avoids all these drawbacks. According to the invention this is obtained by using, for each of the two discharge systems, two amplifying elements in cascode arrangement, the modulation oscillations being supplied to a control electrode of that amplifying element, of which said control electrode is connected, as to the frequency of the oscillations to be produced, to a point of definite potential, for example earth, while the high-frequency oscillation is fed back to a control electrode of the other amplifying element.

The term "cascode arrangement" is to be understood here the series- or cascode-arrangement of two amplifying elements, for example valves or transistors, in which a signal is supplied to the control electrode (grid and base respectively) of one amplifying element, the control electrode (grid and base respectively) of the other amplifying element for the signal frequencies being connected to a point of definite potential, for example earth, and the output electrode (anode and collector respectively) of the first amplifying element being connected to the cathode and emitter respectively of the other amplifying element.

It is to be noted in this respect that the cascode arrangement of two triodes is known per se and is used, for example, to suppress the noise which otherwise occurs when using pentodes.

In a known circuit arrangement, the phase shifts between the points on the delay line connected to the control electrodes of the two discharge systems to which the feedback required for the generator effect takes place, and the point on the delay line common to the junction of the output electrodes of the two discharge systems, equal 180° and 360° respectively. However, it is also known to choose these phase shifts in such arrangements equal to 120° and 240° respectively (see Marconi Review, 1955, 118, page 111).

According to another feature of the invention the control electrodes of the two discharge systems, to which the feedback required for the generator effect takes place, are connected to two points of the delay line, which are situated on either side of the common junction point of the output electrodes of the two systems and the delay line, where the voltages at the central frequency of the produced oscillation differ 60° and 120° respectively in phase with respect to the voltage at the abovementioned junction point.

This results, as contrasted with known arrangements, in the impedance at said common junction point, which impedance is effective when the two systems are inoperative, becoming complex. This opens up the possibility of choosing the phase characteristic so that a linear modulation characteristic is obtained. Said slight phase shifts of the feedback voltages in addition offer the advantage that a lower modulation voltage for a definite frequency swing is sufficient.

Said effect as large as possible a frequency swing with sufficient linearity of the modulation characteristic, can be promoted by extending the delay line, beyond the two said junction points, by some more sections. At the same time, this extension offers the possibility of taking the output voltage of the circuit arrangement from the junction point of two of the sections belonging to either extension. Thus, the stray impedance associated with the point where the voltage is taken off, neither, not appears at a disturbing point of the delay line, notably not at the anode junction point, nor at one of the grid tapping points, which points are already loaded with internal tube capacitances.

Figure 2:
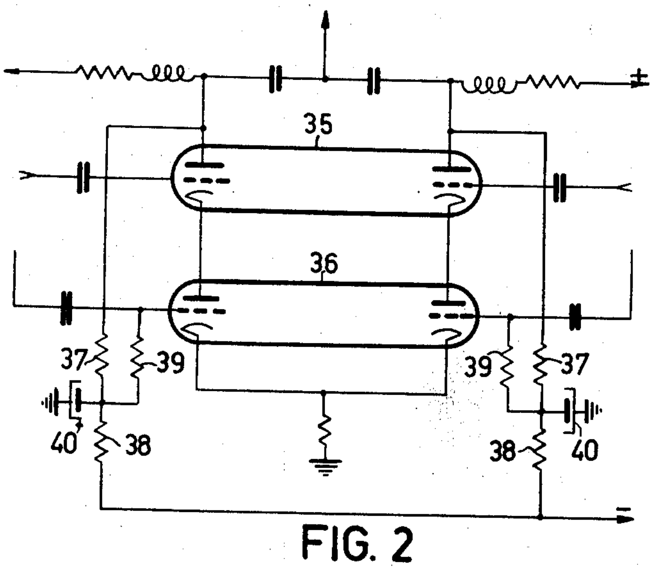

In order that the invention may be readily carried into effect, it will now be described in greater detail with reference to the accompanying drawing, in which FIG. 1 is a circuit diagram of one form of a frequency modulator according to the invention, FIG. 2 is a modified embodiment of a part of the arrangement according to FIG. 1.

The circuit arrangement shown in FIG. 1 contains two sets of each two triodes 1, 2 and 3, 4 respectively in cascode arrangement. The anodes of the lower tubes, 2 and 4, are connected to the cathodes of the upper tubes 1 and 3 respectively and in addition to each other via a resistor 5. The anodes of the tubes 1 and 3 are connected together and via a capacitor 6 to a point 8 approximately at the middle of a delay line 7. The delay line comprises a low-pass L-C-filter with a number of sections, each formed by a series inductance L and a parallel capacitor C, which filter is terminated at its ends through inductances L/2 by a suitable resistor R. The free ends of these resistors R are connected together and, through a potentiometer 9 and a resistor 10, to the positive terminal 11 of a source of direct voltage not shown. The terminal 11 is also connected, through a resistor 12 and a choke coil 13 to the anode of the two tubes 1 and 3 and serves in addition to apply the desired bias voltage to the control grids of the tubes 1 and 3 respectively via a network of resistors 14 to 21.

The cathodes of the two triodes 2 and 4 are earthed via separate resistors 28 and 29 respectively shunted by capacitors 30 and 31 respectively. Mutually they are connected together by a capacitor 32 for the modulation frequencies.

The control grids of the tubes 1 and 3 are connected via capacitors 22 and 23 respectively, to the points 24 and 25 between which the modulation voltage is applied in push-pull from a source 50; when using the circuit arrangement for television this is the video-frequency voltage.

The control grids of the tubes 2 and 4 are respectively connected to two points 26 and 27 respectively of the delay line on either side of the point 8. The distances between these points and the point 8 are chosen so that the phases of the voltages impressed on the grids of the tubes 2 and 4 are preferably shifted approximately 120° and 60° respectively with respect to those of the voltage at 8. However, allowance should be made for the phase shift between the grid voltage and the anode current occurring in the tubes 2 and 4 due to the transit time of the electrons, which phase shift is to be deducted from the above values of 120° and 60° respectively.

The generated oscillations modulated by means of the tubes 1 and 3 of the cascodes, may be taken via a capacitor 33 from a point 34 within the terminating sections of the delay line 7.

In addition to the above-mentioned advantage, the use of triodes in cascode arrangement offers another important advantage with regard to frequency modulators. For, in connection with the linearity of the modulation, a simple relationship between the sensitivity variations and the control voltage is desired through a large range of sensitivity and this is best met by using triodes. This relationship is very favourable inter alia with triodes having a so-called frame grid, for example Philips E88CC, which tube has in addition a comparatively steep slope, namely 12.5 ma./v., so that when using this type of tube for the said purpose, proper modulation sensitivity is ensured.

In the above known devices, for example those where these values amounted to 120° and 240° respectively, the impedance at the anode junction point 8 for the central frequency is adjusted to a real value. On the contrary, in the circuit arrangement according to the invention, this impedance is complex. As a result of this, an additional degree of freedom is obtained in the form of an additional phase shift at the junction point 8 and this permits the phase characteristic of the network as a function of the frequency to be shaped so that linearity of the modulation characteristic is ensured through a maximum width of the mode of oscillation.

An additional control possibility is obtainable by extending the delay line by one or more additional sections on either side of the part of that line between the junction points 26 and 27. By a suitable choice of the number and of the electrical values of these additional sections, the optimum can then be obtained, that is as wide as possible a frequency swing within the permissible deviation from the linearity of the modulation characteristic.

The variant shown in FIG. 2 differs from the circuit-arrangement shown in FIG. 1 in two respects. First, the electrode systems of the tubes 1, 3 and 2, 4 respectively are united in two common bulbs to form dual triodes 35 and 36 respectively, so as to render the stability of the circuit arrangement as high as possible. As a matter of fact, "ageing" of equally loaded tube systems in a common bulb occurs far more evenly than when each of these systems is incorporated in a separate bulb. Secondly, a direct-current negative feedback coupling is used in these cascode systems to compensate variations which will in general, occur when replacing one or more tubes. For that purpose, each of the anodes of the dual triode 35 is connected, via a potentiometer 37, 38 and a resistor 39 respectively, to the control grids of the dual triode 36, the junction point of the resistor 39 and the potentiometer 37, 38 being earthed through a capacitor 40 of high capacitance.

The cut-off frequency of the low-pass filter formed by the delay line 7 is preferably chosen below the second harmonic of the lowest frequency of the produced oscillations. Satisfactory results are obtained with a circuit arrangement as shown in FIG. 1 having a cut-off frequency between 100 and 110 mc./s., the central frequency amounting to 70 mc./s. The frequency swing amounted to well over 20 mc./s. between the highest and the lowest instantaneous frequency. Further values of the circuit arrangement then used were:

Inductances: L—0.6μh.; 13—4μh.;
Capacitors: C—6.4 pf.; 6—1 kpf.; 32—1 kpf.; 30—33 pf.; 31—33 pf.;
Resistors: R—330Ω; 5—3000Ω; 9—5000Ω; 10—180,000Ω; 12—1000Ω; 14—1000Ω; 15, 16, 17 and 19—56,000Ω; 18—25,000Ω; 20 and 21—1 MΩ; 28 and 29—1000Ω.

The voltage at the terminal 11 amounted to +180 v. and that across 17, 18, 19 amounted to approximately 100 v.

The tubes 1 to 4 were Philips triodes of the type E188CC. Naturally, also transistors in analogous arrangement might be used in principle.

What is claimed is:

1. A circuit for the production of frequency modulated oscillations comprising first and second cascode connected discharge devices, third and fourth cascode connected discharge devices, each of said discharge devices having a control electrode, means applying modulation voltages in push-pull to the control electrodes of said first and third devices, delay network means having a midpoint and first and second points of mutual phase difference, means connecting said first and second points to the control electrodes of said second and fourth devices, and means applying the output of each pair of cascode connected devices to said midpoint, the control electrodes of said first and third devices being at a fixed potential with respect to said oscilllations.

2. The circuit of claim 1, in which the mutual phase differences between said first point and said midpoint, and between said second point and midpoint, are 120° and 60° respectively.

3. The circuit of claim 1, in which said first and third devices are in a common air-tight envelope, and said second and fourth devices are in a common air-tight envelope.

4. A circuit for the production of frequency modulated oscillations comprising first and second amplifier device systems in generator arrangement, each of said systems having first and second control electrodes and an output circuit, means applying modulation voltages in push-pull to said first control electrodes, delay network means having a midpoint and first and second points of mutual phase difference, the phase difference between said midpoint and said first point being 120°, the phase difference between said midpoint and said second point being 60°, means connecting said first point to the second control electrode of said first system, means connecting said second point to the second control electrode of said second system, and means connecting said output circuits to said midpoint, said first control electrodes being at a fixed potential with respect to said oscillations.

5. The circuit of claim 4, in which said delay network means comprises a delay line, said first and second points are on opposite sides of said midpoint, and said delay line has end sections further removed from said midpoint than said first and second points.

6. The circuit of claim 5 comprising output means connected to one of said end sections.

References Cited in the file of this patent

UNITED STATES PATENTS

| | | |
|---|---|---|
| 2,345,101 | Crosby | Mar. 28, 1944 |
| 2,346,800 | Usselman | Apr. 18, 1944 |